(12) United States Patent
Bidell et al.

(10) Patent No.: US 10,590,908 B2
(45) Date of Patent: Mar. 17, 2020

(54) HYDROSTATIC AXIAL PISTON MOTOR OF BENT-AXIS CONSTRUCTION

(71) Applicant: Robert Bosch GmbH, Stuttgart (DE)

(72) Inventors: Alexander Bidell, Ulm (DE); Marcus Herrmann, Elchingen (DE); Thomas Abenstein, Buch (DE); Walter Jauernig, Guenzburg (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 15/817,468

(22) Filed: Nov. 20, 2017

(65) Prior Publication Data
US 2018/0195491 A1 Jul. 12, 2018

(30) Foreign Application Priority Data
Jan. 10, 2017 (DE) .................. 10 2017 200 244

(51) Int. Cl.
*F03C 1/40* (2006.01)
*F03C 1/06* (2006.01)
(Continued)

(52) U.S. Cl.
CPC ............ *F03C 1/0694* (2013.01); *F03C 1/061* (2013.01); *F03C 1/0631* (2013.01); *F04B 1/14* (2013.01);
(Continued)

(58) Field of Classification Search
CPC ...... F03C 1/0602; F03C 1/061; F03C 1/0631; F03C 1/0694; F04B 1/14; F04B 1/146;
(Continued)

(56) References Cited

U.S. PATENT DOCUMENTS 5,231,912 A * 8/1993 Akasaka ................... F04B 1/24
91/499
5,649,468 A * 7/1997 Tsurumi ................ F03C 1/0686
91/505
(Continued)

FOREIGN PATENT DOCUMENTS

| DE | 196 42 567 C1 | 8/1997 |
| DE | 196 53 165 C2 | 4/2002 |
| DE | 103 03 487 B4 | 3/2005 |

OTHER PUBLICATIONS

Mobile Applications;, Bosch Rexroth AG; DC-MA/MKT3, and Thomas Eberhardt. "RE 91616/01.12." Data Sheet Series 71, Rexroth Bosh Group, Mar. 21, 2012, 11:51:46, dc-us.resource.bosch.com/media/us/products_13/product_groups_1/mobile_hydraulics_4/pdfs_6/re91616_2012-6.pdf. (Year: 2012).*

(Continued)

*Primary Examiner* — Devon C Kramer
*Assistant Examiner* — Joseph S. Herrmann
(74) *Attorney, Agent, or Firm* — Maginot, Moore & Beck LLP

(57) ABSTRACT

A variable-displacement hydrostatic axial piston motor of bent-axis construction includes a drive shaft, a cylinder drum that pivots in a pivoting plane, and a one-piece port plate nearly symmetrical with a central plane and with two working ports. The motor further includes an adjusting device with an adjusting piston arranged in the port plate, a control valve arranged on the port plate and with a control valve piston, a feedback spring arranged in the port plate and clamped between the adjusting piston and the control valve piston, a counterbalance valve with a counterbalance spool, and two secondary pressure-limiting valves inserted as cartridge-type inserts into the port plate. The counterbalance spool is accommodated in a valve bore in the port plate. The two working ports are situated on the port plate opposite to (Continued)

the first side. The two secondary pressure-limiting valves are arranged on the same side as the port surfaces.

11 Claims, 7 Drawing Sheets

(51) Int. Cl.
  *F04B 1/146* (2020.01)
  *F04B 49/22* (2006.01)
  *F04B 1/28* (2006.01)
  *F04B 1/14* (2020.01)
  *F16H 61/423* (2010.01)

(52) U.S. Cl.
  CPC ............... *F04B 1/146* (2013.01); *F04B 1/28* (2013.01); *F04B 49/22* (2013.01); *F16H 61/423* (2013.01)

(58) Field of Classification Search
  CPC .. F04B 1/28; F04B 49/22; F16K 1/126; F16K 31/1221; G05D 16/10; F16H 61/423
  See application file for complete search history.

(56) References Cited

U.S. PATENT DOCUMENTS

| | | | | |
|---|---|---|---|---|
| 5,884,984 | A * | 3/1999 | Arai | E02F 9/123 303/11 |
| 5,992,148 | A * | 11/1999 | Satake | E02F 9/123 60/468 |
| 6,027,179 | A * | 2/2000 | Arai | B60T 1/005 180/306 |
| 6,182,448 | B1 * | 2/2001 | Ohkura | F16H 61/4026 60/445 |
| 6,279,452 | B1 * | 8/2001 | Moya | F04B 1/2014 91/506 |
| 6,283,721 | B1 * | 9/2001 | Gollner | F03C 1/0694 417/222.1 |
| 6,351,945 | B1 * | 3/2002 | Stickel | F16H 61/4157 60/445 |
| 6,925,799 | B2 * | 8/2005 | Ju | F04B 49/002 60/443 |
| 8,122,714 | B2 * | 2/2012 | Yatabe | E02F 9/128 60/443 |

OTHER PUBLICATIONS

RE 91616, Edition 05.2016, product sheet, Variable plug-in motor, A6VE Series 71, Bosh Rexroth AG, Elchingen, Germany (44 pages). (Year: 2016).*

RE 91616, Edition 05.2016, product sheet, Variable plug-in motor, A6VE Series 71, Bosch Rexroth AG, Elchingen, Germany (44 pages).

* cited by examiner

HYDROSTATIC AXIAL PISTON MOTOR OF BENT-AXIS CONSTRUCTION

This application claims priority under 35 U.S.C. § 119 to patent application no. DE 10 2017 200 244.1, filed on Jan. 10, 2017 in Germany, the disclosure of which is incorporated herein by reference in its entirety.

BACKGROUND

The disclosure relates to a variable displacement hydrostatic axial piston motor of bent-axis construction, which comprises a drive shaft, a cylinder drum that can be pivoted in a pivoting plane, a one-piece port plate, which has a central plane extending parallel to the pivoting plane and on which there are two working ports with flat port surfaces, one of which is situated on one side of the central plane and the other is situated at the same distance from the central plane on the other side of the central plane. For adjustment of the displacement, the hydrostatic axial piston motor has an adjusting device, which comprises an adjusting piston arranged in a cylindrical receiving space of the port plate, a control valve arranged on a first side of the port plate and having a control valve piston, and a feedback spring, which is arranged in the port plate, is clamped between the adjusting piston and the control valve piston and is arranged together with the adjusting piston and the control valve piston on one axis. A counterbalance valve having a counterbalance spool is provided, which is intended to reduce the risk of overspeeding and cavitation of the axial piston motor in an open hydraulic circuit. To limit the pressure, there are furthermore two secondary pressure-limiting valves, which are inserted as cartridge-type inserts into the port plate, of which one secondary pressure-limiting valve is arranged on one side of the central plane and the other secondary pressure-limiting valve is arranged on the other side. The secondary pressure-limiting valves ensure that the pressure is not too high when the axial piston motor is operating as a pump, something that can occur under a negative load.

A hydrostatic axial piston motor having the above features is known from datasheet RE 91616, Edition 05.2016, for example. In this datasheet, pages 27 to 29 show various versions of a hydrostatic axial piston motor, the displacement of which can be varied with the aid of an adjusting device. The adjusting piston of the adjusting device is a differential piston, which is acted upon over an annular surface by the high pressure prevailing in a port of the axial piston motor and the larger piston surface of which delimits an adjusting chamber, which is connected to the control valve. The control valve piston of the control valve is acted upon in one direction by a force which corresponds to the level of a control signal and is, for example, the force of an electro-proportional magnet or a force produced by a control pressure and is acted upon in the opposite direction by the force of a feedback spring, which is clamped between the control valve piston and the adjusting piston, with the result that the force exerted on the control valve piston by the feedback spring depends on the position of the adjusting piston. Depending on the level of the force corresponding to the control signal, the adjusting piston is thus moved by the control valve to a position such that the spring force is equal to the force specified by the control signal.

In the case of the automatic high-pressure-dependent adjustment discussed in said datasheet too, the adjusting piston is a differential piston, which is acted upon over an annular surface by the high pressure prevailing in a port of the axial piston motor and the larger piston surface of which delimits an adjusting chamber, which is connected to a control valve. The control valve piston of the control valve is acted upon in one direction by a spring, which is set to a fixed value, the force of which, which is exerted on the control valve piston, is therefore not dependent on the position of the adjusting piston, and is acted upon in the opposite direction by the high pressure.

A hydrostatic axial piston motor of bent-axis construction with electro-proportional adjustment of the displacement is known from DE 196 53 165 C2. This axial piston motor has an adjusting device which comprises an adjusting piston, which is arranged in a cylindrical receptacle of the port plate and is designed as a differential piston, a control valve arranged on a first side of the port plate and having a control valve piston, and a feedback spring, which is arranged in the port plate and is clamped between the adjusting piston and the control valve piston. The axes of the adjusting piston, the feedback spring and the valve piston are aligned with one another and are therefore arranged together on one axis. The control valve piston is acted upon in one direction by the force of the feedback spring and in the opposite direction by the force of an electro-proportional magnet. In the event of a non-equilibrium of forces, the control valve piston is moved out of its central position, in which it shuts off a control valve port connected to an adjusting chamber with a small positive or negative overlap or a zero overlap, with the result that pressure medium is fed to the adjusting chamber at the adjusting piston or displaced from the adjusting chamber, causing the adjusting piston to move and, in the process, to change the force exerted by the feedback spring on the control valve piston until an equilibrium of forces is reestablished at the control valve piston and the control valve piston once again moves into its central position.

In the case of the versions of a hydrostatic axial piston motor which are shown on pages 27 and 28 of datasheet RE 91616, Edition 05.2016, a brake valve having a counterbalance valve and two check valve combinations, each consisting of two check valves, which are arranged in a separate brake valve housing, is attached to the port plate of the axial piston motor. The secondary pressure-limiting valves are arranged in the port plate perpendicularly to a central plane of the port plate.

Pages 32 and 33 of datasheet RE 91616, Edition 05.2016 show versions of a variable-displacement hydrostatic axial piston motor in which the adjusting piston of the adjusting device for the displacement is a synchronizing piston, i.e. a piston which has two effective areas of equal size. This can be inserted easily into a blind hole in the port plate, wherein two adjusting chambers are formed in front of the two ends of the adjusting piston after the closure of the blind hole. The manner in which the displacement is adjusted means that there does not appear to be any particular advantage in any position of the control valve in relation to the adjusting piston, and therefore there is very great freedom in the arrangement of the control valve. These versions of a hydrostatic axial piston motor have a port plate into which the counterbalance valve and the two check valve combinations are integrated.

SUMMARY

It is the underlying object of the disclosure to develop a hydrostatic axial piston motor of bent-axis construction having a drive shaft, having a cylinder drum that can be pivoted in a pivoting plane, having a one-piece port plate, which has a central plane extending parallel to the pivoting plane and on which there are two working ports with flat port surfaces, one of which is situated on one side of the central plane and the other is situated at the same distance from the central plane on the other side of the central plane, having an adjusting device, which comprises an adjusting piston arranged in a cylindrical receptacle of the port plate, a control valve arranged on a first side of the port plate and having a control valve piston, and a feedback spring, which is arranged in the port plate, is clamped between the adjusting piston and the control valve piston and is arranged together with the adjusting piston and the control valve piston on one axis, having a counterbalance valve, which has a counterbalance spool, and having two secondary pressure-limiting valves, which are inserted as cartridge-type inserts into the port plate, of which one secondary pressure-limiting valve is arranged on one side of the central plane and the other secondary pressure-limiting valve is arranged on the other side, in such a way that it is of compact construction and has few sealing locations.

Fundamentally, this object is achieved by virtue of the fact that the counterbalance spool is integrated into the port plate. According to the disclosure, this integration is accomplished by virtue of the fact that the counterbalance spool is accommodated in a valve bore in the port plate, said valve bore extending perpendicularly to the central plane, that the two working ports are situated on an opposite side of the port plate to the first side and the port surfaces thereof are designed as two mutually spaced port surfaces, and that the two secondary pressure-limiting valves are arranged on the same side of a third plane as the port surfaces, said plane passing through the axis of the valve bore for the counterbalance spool and extending perpendicularly to the axis of the adjusting device, and are arranged between the two port surfaces in a view parallel to the central plane.

Owing to the integration of the counterbalance valve into the port plate, there are no longer any sealing surfaces between the port plate and a separate housing of the counterbalance valve. A compact construction is obtained.

Advantageous embodiments of a hydrostatic axial piston motor according to the disclosure can be found in the dependent claims.

If the adjusting device comprises a differential piston as an adjusting piston, then, as is apparent from DE 196 53 165, the piston per se is inserted from one side and a piston rod from the other side into a receiving space of the port plate, and they are connected to one another by means of a screw. On the piston insertion side, the receptacle is closed by means of a cover secured on the port plate. It is then advantageous if, in a hydrostatic axial piston motor according to the disclosure, the port plate has a depression between the two port surfaces and the cover which closes the receiving space of the port plate for the adjusting piston and hence a pressure space on one side of the adjusting piston is arranged in the depression in the port plate. Thus, the cover is not an obstruction during the fastening of lines to the port surfaces and does not increase the dimensions of the axial piston motor. Of course, the depression is also advantageous if the adjusting piston is not a differential piston but is inserted into the receiving space through an opening between the two port surfaces and the opening is closed by means of a cover.

It is known from DE 103 03 487 B4, for example, how the counterbalance spool of the counterbalance valve is incorporated with the aid of four check valves into the respective return line in which the pressure medium flows back to a tank from the hydraulic motor. It is furthermore known that in each case two of these check valves, of which a first check valve, which is arranged between a working port and an inlet of the counterbalance valve and blocks flow towards the working port, and a second check valve, which is arranged between the outlet of the counterbalance valve and the same working port and opens towards the working port, can be combined to form a cartridge-type check valve insert having a central axis. It is also known that the counterbalance spool is assigned just two check valves, of which in each case one is arranged between a working port and an inlet of the counterbalance valve. The counterbalance spool and the valve bore thereof are then of more complex configuration than in the solution with four check valves.

It is advantageous if, in a hydrostatic axial piston motor according to the disclosure, a check valve, which is arranged between a working port and an inlet of the counterbalance valve and blocks flow towards the working port, or the cartridge-type check valve insert associated with one working port, is arranged parallel to the axis of the counterbalance spool on one side of the central plane, and a check valve, which is arranged between the other working port and a second inlet of the counterbalance valve and blocks flow towards the other working port, or the cartridge-type check valve insert associated with the other working port, is arranged parallel to the axis of the counterbalance spool on the other side of the central plane.

It is expedient if the two check valves or the cartridge-type check valve inserts are arranged in such a way that both the central axes thereof are in alignment with one another.

The check valves or the two cartridge-type check valve inserts are preferably arranged on the same side of the third plane as the secondary pressure-limiting valves, although the distance between the check valves or the cartridge-type check valve inserts and the third plane is less than the distance between the secondary pressure-limiting valves and the third plane.

The cartridge-type check valve inserts and the installation bores in the port plate can remain unchanged relative to already known designs if a first fluid passage, which extends within the port plate between a port surface and an installation bore for a check valve cartridge, opens into the installation bore closer to the central plane than a second fluid passage, which extends within the port plate between a secondary pressure-limiting valve and the same installation bore, and if the two fluid passages intersect in a projection parallel to the central plane of the port plate and perpendicularly to the axis of the adjusting device.

The port plate of a hydrostatic axial piston motor generally has through holes, through which screws pass, by means of which the port plate is connected to another housing part of the axial piston motor. The through holes have a limiting effect on the route of the passages introduced into the port plate. If the port plate has a first through hole at a distance from the third plane, on the same side as that on which the working ports are also situated, said through hole being at a certain distance from the central plane, and a second through hole, the distance of which from the third plane is less than that of the first through hole and/or the distance of which from the central plane is greater than that of the first through hole, then a first fluid passage advantageously passes between the first through hole and the second through hole.

The port surfaces preferably lie in a fourth plane, which extends parallel to the axis of the drive shaft and is perpendicular to the pivoting plane.

The two secondary pressure-limiting valves are preferably arranged with the valve axes thereof parallel to the central plane.

BRIEF DESCRIPTION OF THE DRAWINGS

An illustrative embodiment of a hydrostatic axial piston motor according to the disclosure is shown in the drawings.

The disclosure is now explained in greater detail with reference to the figures of these drawings.

In the drawings:

FIG. 1 shows a side view of the axial piston motor,

Figure 1:
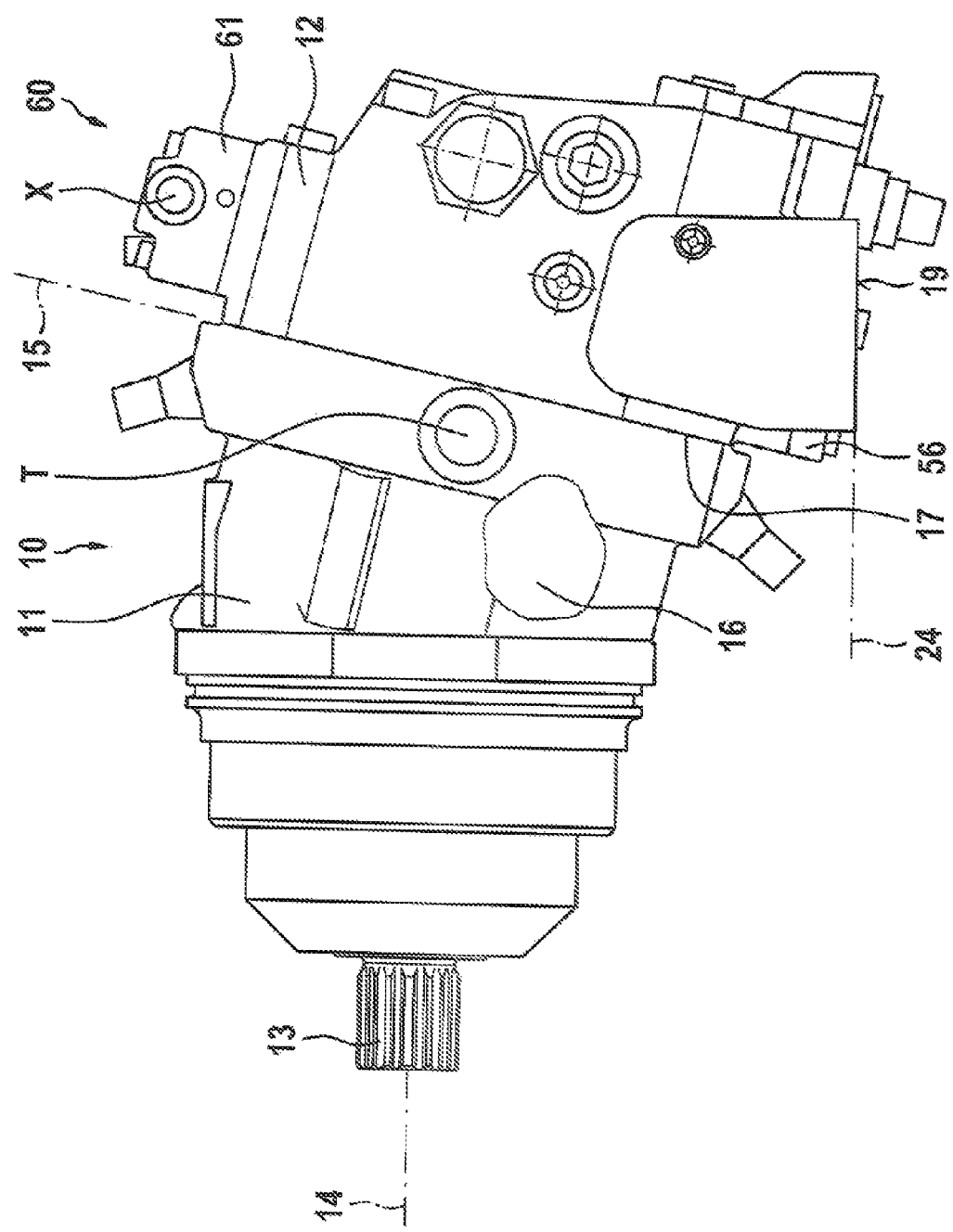
Figure 2:
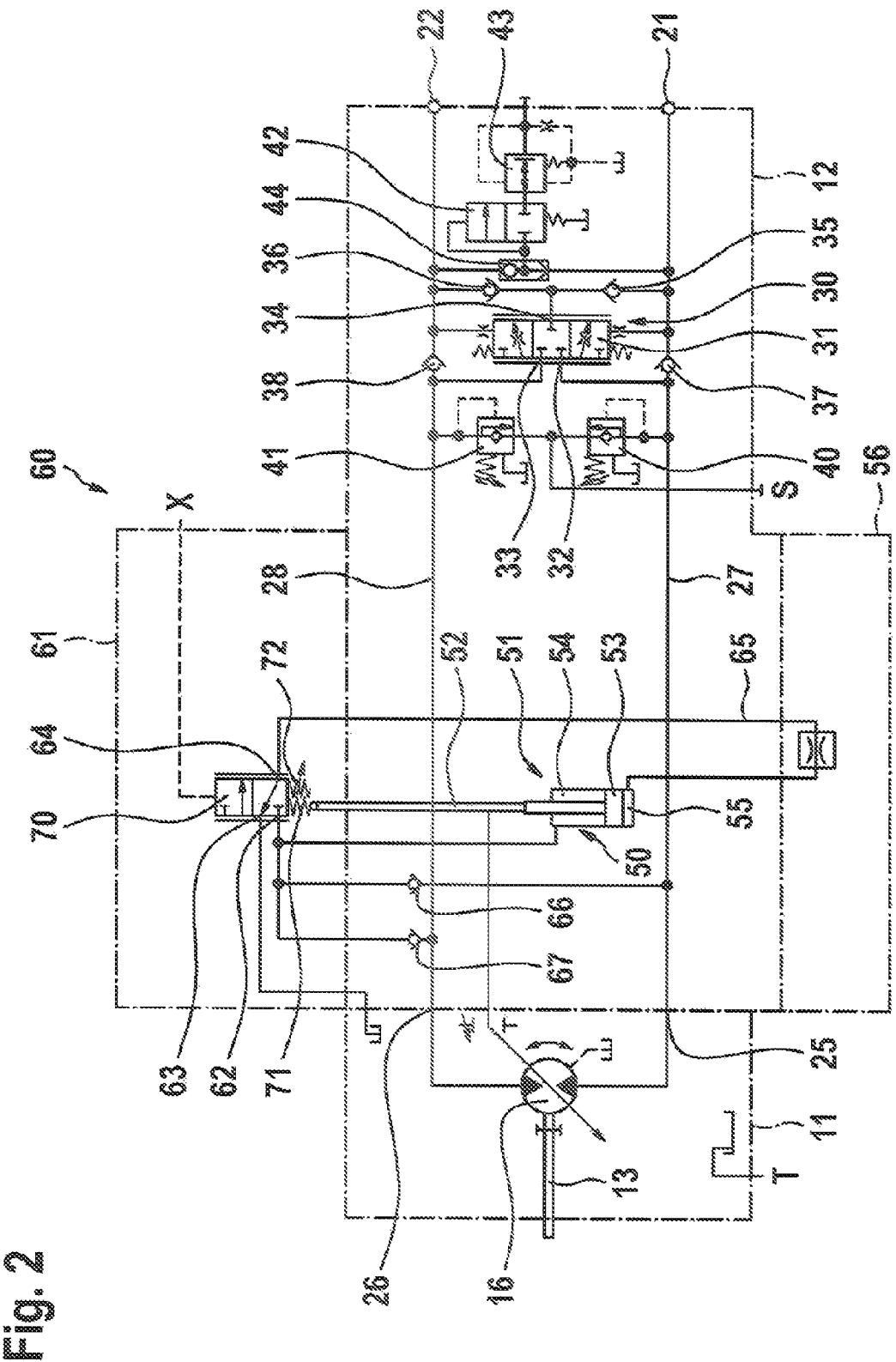
Figure 3:
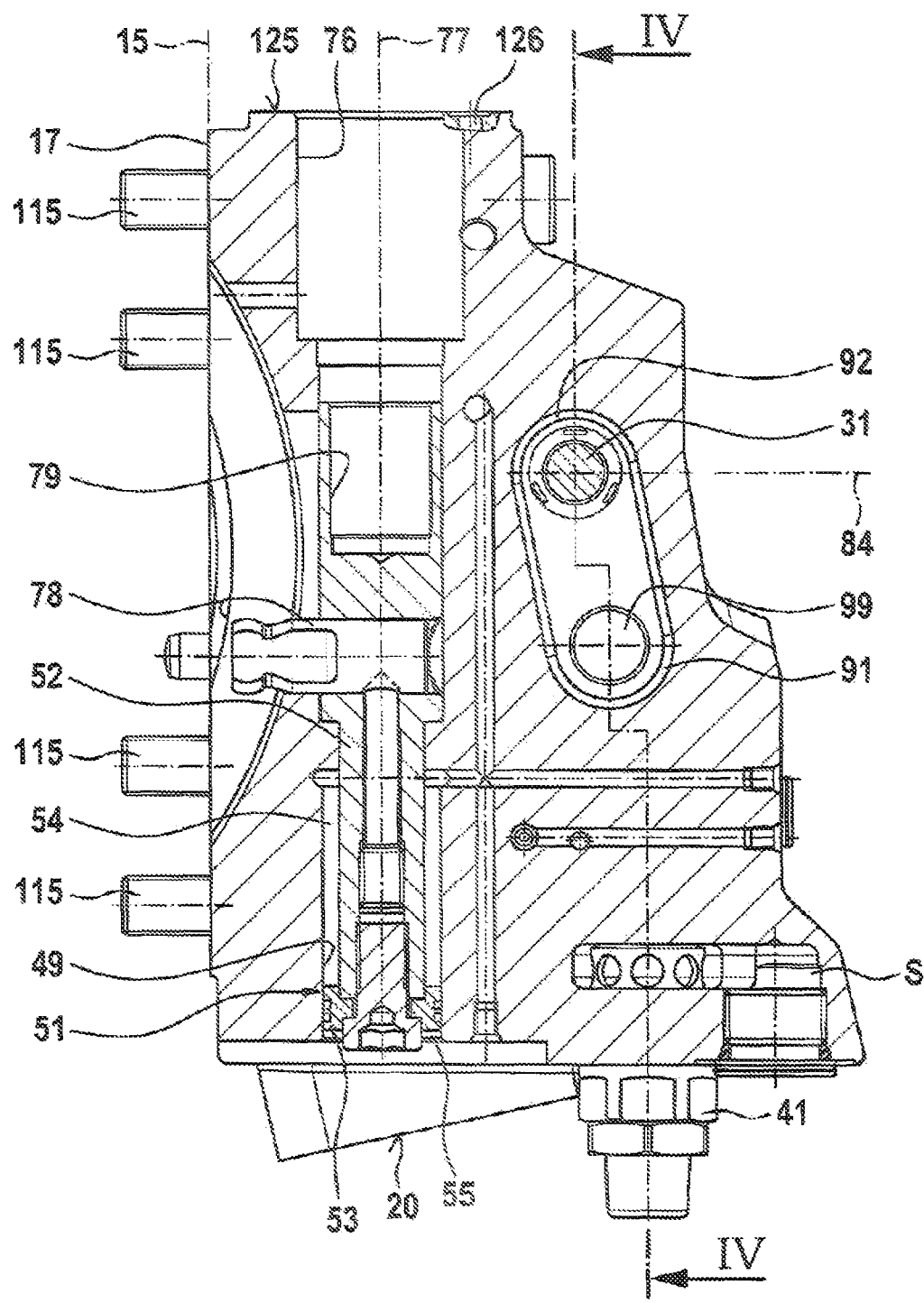
Figure 4:
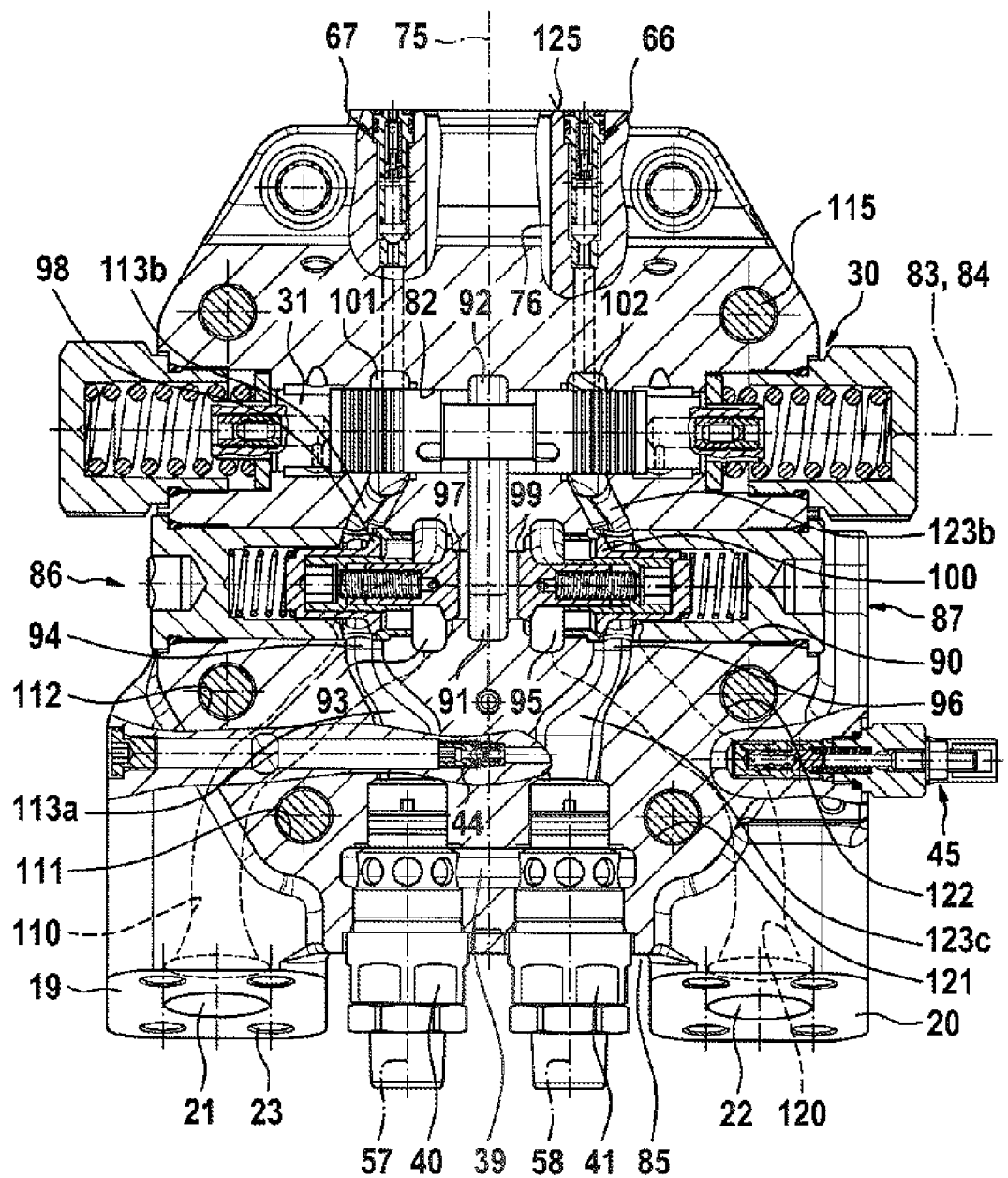
Figure 5:
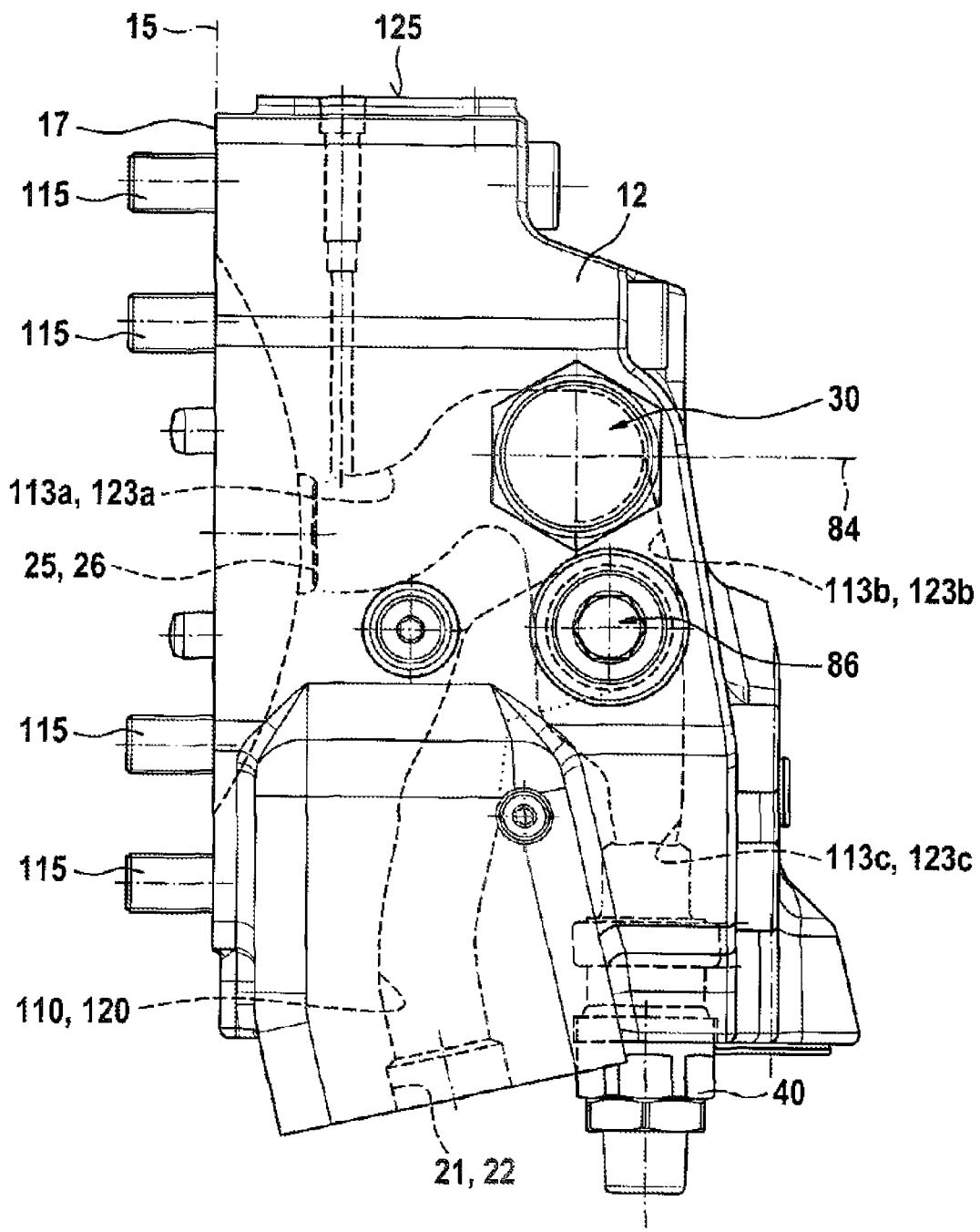
Figure 6:
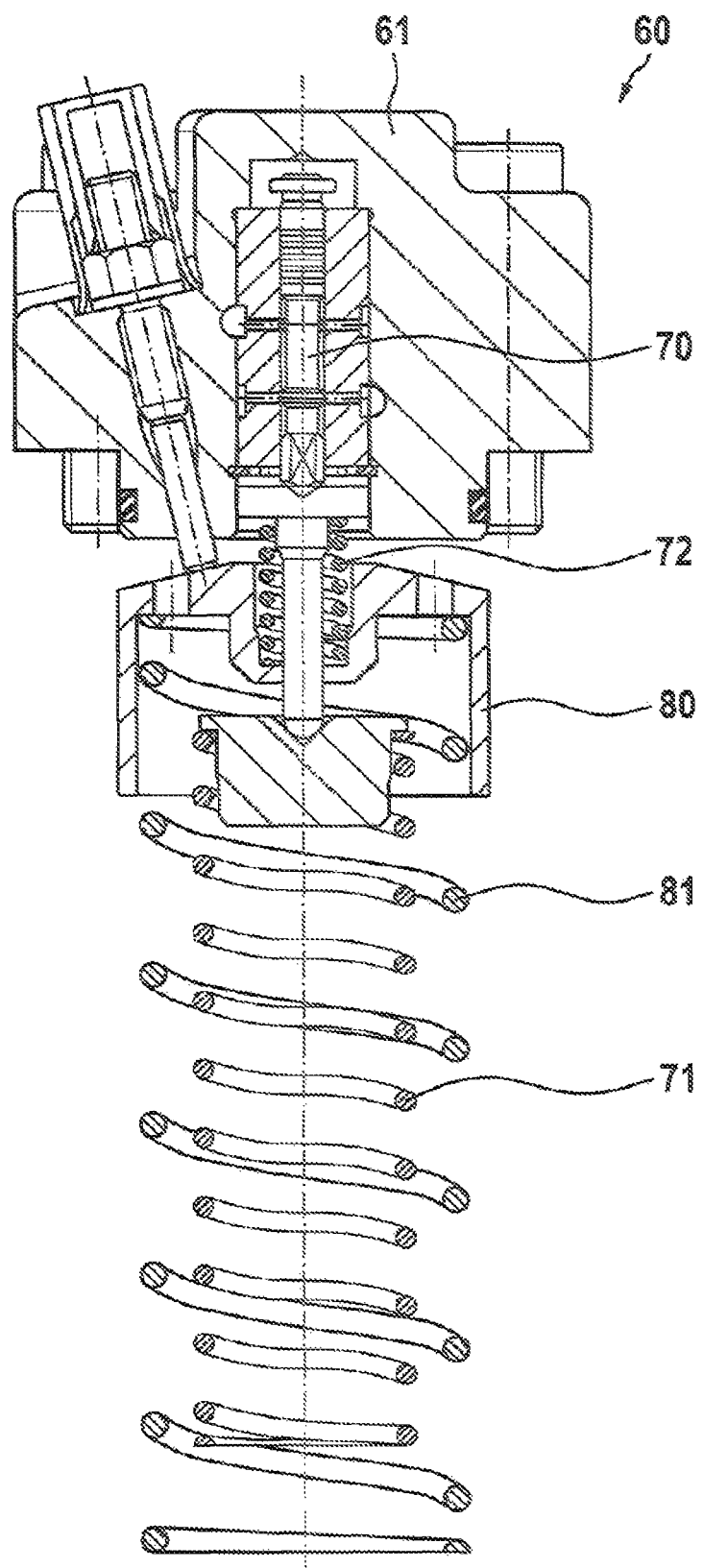
Figure 7:
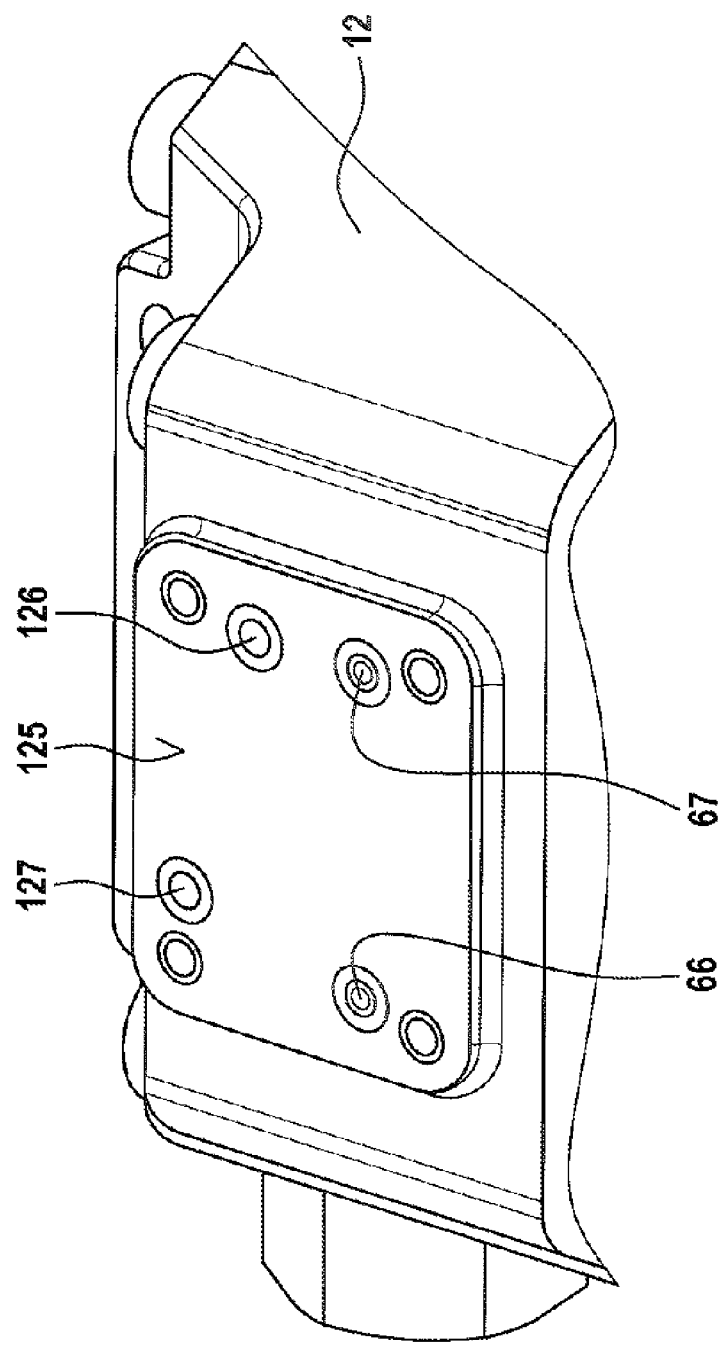

FIG. 2 shows a circuit diagram of the axial piston motor including all the valves present in the illustrative embodiment, FIG. 3 shows a section through the port plate of the axial piston motor in a central plane, in which the axis of the drive shaft is situated and which extends parallel to the pivoting planes of a cylinder drum of the axial piston motor, FIG. 4 shows a section along the line IV-IV in FIG. 3, FIG. 5 shows a side view of the port plate corresponding to FIG. 1, additionally showing concealed contours, FIG. 6 shows a control unit to be inserted into the port plate, with a control valve for a proportionately to a control pressure, and FIG. 7 shows a partial plan view of the port plate in perspective.

DETAILED DESCRIPTION

The illustrated hydrostatic axial piston motor of bent-axis construction has a housing 10 having a pot-type main housing part 11 and having a port plate 12, by means of which the main housing part 11 is closed. In the bottom of the main housing part 11 there is a through opening, through which the drive shaft 13 of the axial piston motor passes to the outside. The axis of the drive shaft 13 is shown in FIG. 1 and is provided with the reference number 14. It can also be seen from FIG. 1 that the free edge of the main housing part lies in a plane 15 which is not perpendicular to the axis 14 of the drive shaft 13 but slopes slightly relative to said axis. The mounting edge 17 of the port plate 12 also lies in this plane when it is secured on the main housing part 11. The axial piston motor is a motor with a variable displacement and has a cylinder drum 16, which can be pivoted in pivoting planes parallel to the plane of the drawing in FIG. 1.

The port plate has two port surfaces 19 and 20, which are designed as SAE port surfaces and in which there are centrally a port opening 21 and a port opening 22, respectively, and, distributed around the port opening, four threaded holes 23. The two port surfaces 19 and 20 lie in a plane 24, which extends parallel to the axis 14 of the drive shaft and perpendicularly to the pivoting planes of the cylinder drum 16 when the port plate 12 is secured on the main housing part 11. Plane 24 is referred to as the fourth plane in the description above and in the patent claims. A port surface having a port opening and the threaded holes can also be referred to overall as a working port.

In the circuit diagram shown in FIG. 2, the main housing part 11 and the port plate 12 are symbolized by rectangles drawn in chain-dotted lines. The drive mechanism of the axial piston motor with the cylinder drum 16, which can be pivoted together with a control plate, and with the drive shaft 13 is depicted with corresponding symbols in the main housing part 11. In a known manner, the control plate has two control openings, which overlap the inner openings 25 and 26 on the port plate 12, wherein, within the port plate 12, a first fluid passage 27 extends between inner opening 25 and the port opening 21 in port surface 19 and a second fluid passage 28 extends between inner opening 26 and the port opening 22 in port surface 20.

A series of valves is arranged within the port plate 12. A counterbalance valve 30 having a continuously movable counterbalance spool 31 has two inlets 32 and 33, of which one inlet 32 is connected to the first fluid passage 27 and the second inlet 33 is connected to the second fluid passage 28. An outlet 34 of the counterbalance valve can be connected via a first check valve 35 to the first fluid passage 27 and via a second check valve 36 to the second fluid passage 28, wherein check valve 35 opens towards fluid passage 27 and check valve 36 opens towards fluid passage 28. Arranged in fluid passage 27, between the attachment points of inlet 32 and outlet 34 of the counterbalance valve to said passage, is a check valve 37, which opens from port opening 21 towards inner opening 25. Arranged in fluid passage 28, between the attachment points of inlet 33 and outlet 34 of the counterbalance valve to said passage, is a check valve 38, which opens from port opening 22 towards inner opening 26.

When there are no further forces acting on the counterbalance spool 31, said spool adopts a spring-centered central position, in which all three ports of the counterbalance valve are shut off. Via a first control line, a first control surface on the counterbalance spool can be supplied with the pressure prevailing in the segment of the first fluid passage 27 which is situated between port opening 21 and check valve 37. Via a second control line, a second control surface on the counterbalance spool can be supplied with the pressure prevailing in the segment of the first fluid passage 28 which is situated between port opening 22 and check valve 38. If the pressure in said segment of fluid passage 27 is higher than in said segment of fluid passage 28, the counterbalance spool 31 is displaced out of the central position into positions in which inlet 33 is connected to the outlet 34. If the pressure in said segment of fluid passage 28 is higher than in said segment of fluid passage 27, the counterbalance spool 31 is displaced out of the central position into positions in which inlet 32 is connected to the outlet 34. Here, the flow cross section between the respective inlet and the outlet of the counterbalance valve increases continuously with increasing travel of the counterbalance spool.

Moreover, a pressure-limiting and anti-cavitation valve 40 and a pressure-limiting and anti-cavitation valve 41 are accommodated in the port plate 12, said valves having both a pressure-reducing function and a nonreturn function and being arranged in series and in mirror symmetry with respect to one another between the segments of fluid passages 27 and 28 which are situated between the check valves 37, 38 and the inner openings 25, 26. By virtue of the pressure-limiting function of one pressure-limiting and anti-cavitation valve and the simultaneous nonreturn function of the other pressure-limiting and anti-cavitation valve, pressure fluid can thus flow from one fluid passage 27, 28 into the other fluid passage 28, 27. A feed opening S is connected to the connecting passage 39 between the two valves 40 and 41. In their "pressure-limiting" function, valves 40 and 41 form "secondary" pressure-limiting valves which, unlike primary pressure-limiting valves, which limit the pump pressure, limit the pressure at a hydraulic motor or, in more general terms, at a hydraulic load.

Moreover, a switching valve 42, which is designed as a hydraulically switched 2/2-way valve, a brake pressure reducing valve 43, which is connected to the outlets of the switching valve 42, and a shuttle valve 44 are accommodated in the port plate 12, said shuttle valve being connected by means of a first inlet to the segment of the first fluid passage 27 which is situated between port opening 21 and check valve 37, being connected by means of a second inlet to the segment of the second fluid passage 28 which is situated between port opening 22 and check valve 38, and being connected by means of its outlet to the inlet of the switching valve 42. Thus, the respectively higher pressure from said segments is available at the inlet of the switching valve 42. The switching valve 42 has a shutoff position, which it can adopt under the action of a spring, and is acted upon in the direction of an opening position by the pressure at its inlet. In terms of design, the switching valve 42 and the brake pressure reducing valve are combined in accordance with DE 196 42 567 C1, which is also published as U.S. Pat. No. 5,996,616 A with the disclosure of U.S. Pat. No. 5,996,616 A incorporated herein by reference in its entirety, to form a brake release valve 45 with a single valve spool (see FIG. 4).

The port plate 12 furthermore has a circular-cylindrical blind hole 49 (see FIG. 3), in which an adjusting piston 51 belonging to an adjusting device 50 for the displacement of the axial piston motor is movably guided, said piston being designed as a differential piston and projecting by means of a piston rod 52 from the bottom of the blind hole 49. By means of the pressure piston 53 and the piston rod 52 of the adjusting piston 50, an annular pressure chamber 54 on the piston rod side and an adjusting chamber 55 of circular cross section on the opposite side from the piston rod are formed within the blind hole 49. The blind hole 49 is closed by a cover 56 screwed to the port plate.

A control valve 60 having a dedicated housing 61 is mounted on the port plate 12. The control valve 60 is a proportional 3/2-way valve, which has a pressure port 62, a tank port 63 and an adjusting port 64, which is connected fluidically to the adjusting chamber 55 via a bore 65 in the port plate 12 and in the cover 56. The respectively higher pressure from the two inner openings 25 and 26 is present at the pressure port 62 of the control valve 60 by way of two check valves 66 and 67, which are once again arranged in the port plate 12. The tank port 63 of the control valve is open towards the housing interior of the axial piston motor, in which a tank pressure prevails. Via the two check valves 66 and 67, the respectively higher pressure from the two inner openings 25 and 26 is also present in the pressure chamber 54 of the adjusting piston 51.

The control valve piston 70 of the control valve 60 is acted upon by way of a connection of the adjusting port 64 to the pressure port 62 by a control pressure that can be supplied via a control pressure port X of the housing 61 and is acted upon by way of a connection of the adjusting port 64 to the tank port 63 by a feedback spring 71 and a return spring 72, the force of which is adjustable. The feedback spring 71 is clamped between the control valve piston 70 and the piston rod 52 of the adjusting piston 51. The stress of said spring and hence the force exerted by it on the control valve piston 70 change with the position of the adjusting piston 51. Thus, the position of the adjusting piston and hence the position of the cylinder drum 16 are fed back as a force to the control valve piston 70. This piston thus in each case allows pressure medium to flow to the adjusting chamber 55 or to be displaced from the adjusting chamber until the force exerted on it by the springs 71 and 72 is exactly the same as the force produced by the control pressure. Adjustment of the displacement of the axial piston motor in proportion to the control pressure is thus obtained.

The design configuration of the port plate 12 and the arrangement of the various valves therein is shown in greater detail in FIGS. 3 to 5, the port plate being in one piece if the adjusting device inserted therein and the large number of inserted valves are ignored. A central plane 75, which extends parallel to the pivoting planes of the cylinder drum 16 and with respect to which the port plate 12 is largely but not completely symmetrical, can be seen in FIG. 4. In the central plane, it has a through hole 76 with an axis 77 which extends parallel to the mounting edge 17 and hence to plane 15 and has segments of different diameters. This through hole 76 serves to receive the various components of the adjusting device 50, of which the adjusting piston 51 with the pressure piston 53 and the piston rod 52 can be seen in the illustration in FIG. 3. The pressure chamber 54 and the adjusting chamber 55 can be seen, although in FIG. 3 said chamber has not yet been closed by means of the cover 56. Secured in the piston rod 52 is an adjusting pin 78, which engages in the control plate (not shown specifically). The feedback spring 71 is accommodated in a blind hole 79 in the piston rod 52 and in segments of the through hole 76 towards which the blind hole 79 is open. An adjustable stop disk 80 and a follow-up spring 81 for the stop disk, which are shown in FIG. 6, are furthermore arranged in the segment of the through hole 76 ahead of the piston rod 52. By adjusting the stop disk 80, it is possible to set the preload of the return spring 72. The through hole 76 is closed on the side opposite the cover 56 by placing the control valve 60 on the port plate 12.

Design details of the control valve, which is known per se, and of the springs 71 and 81 can be found in FIG. 6.

It is clearly apparent from FIG. 4 that the counterbalance spool 31 is accommodated in a valve bore 82 in the port plate 12, said bore extending perpendicularly to the central plane 75. The axis of the counterbalance spool 31 and the axis of the valve bore 82, which coincides with said axis, are denoted by 83. If a plane 84 which passes through axis 83 and to which the axis 77 of the through hole 76 is perpendicular is defined, the control valve 60 secured on one side of the port plate 12 is situated on one side of this plane 84. Plane 84 is referred to as the third plane.

The port surfaces 19 and 20 are situated on the opposite side of the port plate 12 from the one on which the control valve 60 is secured. The plane 24 in which the port surfaces are situated is perpendicular to the central plane 75. As can be seen particularly clearly in FIG. 4, the two port surfaces 19 and 20 are at a distance from one another. Formed between them on the port plate 12 is a depression 85, in which the cover 56 is situated. As can be seen from FIG. 1, this cover thus projects only slightly above the port surfaces. The two pressure-limiting and anti-cavitation valves 40 and 41 are arranged on the same side of plane 84 as the port surfaces 19 and 20. The two valves are designed as cartridge-type inserts and are inserted into corresponding installation holes in the port plate 12. In particular, valves 40 and 41 are situated between the two port surfaces 19 and 20, when viewed parallel to the central plane 75. The axes 57 and 58 of the installation holes for valves 40 and 41 and hence also the axes of valves 40 and 41 extend parallel to the central plane 75. In addition, the axes also extend perpendicularly to plane 84. Valve 40 is situated on the same side of the central plane 75 as port opening 21, and valve 41 is situated on the other side of the central plane 75, in mirror symmetry with respect to valve 40.

The two check valves 35 and 37, on the one hand, and the two check valves 36 and 38, on the other hand, are combined to form a check valve cartridge 86 and 87, respectively. One check valve cartridge 86 is installed from one side and the other check valve cartridge from the opposite side in a through-receptacle 90 of the port plate 12. The receptacle 90 is situated in such a way that the axes of the two check valve cartridges extend parallel to the axis 83 and are in alignment with one another. The distance between the check valve cartridges and plane 84 is less than the distance between valves 40 and 41 and plane 84.

A fluid chamber 91 is formed in the central plane 75 in the receptacle 90. It is connected by a passage extending in the central plane 75 to a fluid chamber 92 of the valve bore 76 for the counterbalance spool 31, said fluid chamber 92 likewise being situated in the central plane 75 and forming the outlet of the counterbalance valve 30. In the receptacle 90 for the check valve cartridges, fluid chamber 91 is followed on one side in a direction away from the central plane firstly by a fluid chamber 93 and then a fluid chamber 94. On the other side in a direction away from the central plane 75, fluid chamber 91 is followed by a fluid chamber 95 and a fluid chamber 96. Arranged between the two fluid chambers 91 and 93 is a closing body 97, which belongs to check valve 35 in FIG. 2 and which prevents a flow of pressure medium from fluid chamber 93 into fluid chamber 91 but allows a flow of pressure medium in the opposite direction. Arranged between the two fluid chambers 93 and 94 is a closing body 98, which belongs to check valve 37 in FIG. 2 and which prevents a flow of pressure medium from fluid chamber 94 into fluid chamber 93 but allows a flow of pressure medium in the opposite direction. Arranged between the two fluid chambers 91 and 95 is a closing body 99, which belongs to check valve 36 in FIG. 2 and which prevents a flow of pressure medium from fluid chamber 95 into fluid chamber 91 but allows a flow of pressure medium in the opposite direction. Arranged between the two fluid chambers 95 and 96 is a closing body 100, which belongs to check valve 38 in FIG. 2 and which prevents a flow of pressure medium from fluid chamber 96 into fluid chamber 95 but allows a flow of pressure medium in the opposite direction.

A fluid chamber 101, which is connected to the inner opening 25 and forms inlet 32 of the counterbalance valve 30 is situated in the valve bore 76, at a distance from fluid chamber 92, on one side of the central plane 75. On the other side of the central plane 75 is a fluid chamber 102, which is connected to the inner opening 26 and forms inlet 33 of the counterbalance valve 30. In the spring-centered central position shown in FIG. 4, the counterbalance spool 31 shuts off fluid chambers 101 and 102 from fluid chamber 92. During a movement out of the central position, the counterbalance spool opens a through flow cross section between fluid chambers 101 and 92 or between fluid chambers 102 and 92, depending on the direction of motion, while the other fluid chambers in each case remain shut off from one another.

A fluid passage 110 formed in the port plate 12 leads from port opening 21 to the fluid chamber 93 of check valve cartridge 86. In this case, fluid passage 110 extends between two through holes 111 and 112 for fastening screws 115, by means of which the port plate 12 and the main housing part 11 are secured on one another. Overall, there are four through holes for fastening screws on each side of the central plane 75, of which through holes there are, in turn, four on one side and four on the other side of the third plane 84. The through holes extend perpendicularly to plane 15. Through hole 111 is at a shorter distance from the central plane 75 than through hole 112 and is at a greater distance from the third plane 84 than through hole 112.

The fluid chamber 94 of check valve cartridge 86 is part of a fluid passage system which extends between check valve 37, pressure-limiting and anti-cavitation valve 40 and inner opening 25 in FIG. 2 and has segment passages 113a, 113b and 113c. Segment passage 113a extends between fluid chamber 101 and inner opening 25, segment passage 113b extends between fluid chamber 101 and fluid chamber 94, and segment passage 113c extends between fluid chamber 94 and pressure-limiting and anti-cavitation valve 40. This segment passage 113c and fluid passage 110 intersect when viewing the port plate in a direction perpendicular to plane 15, as is the case in FIG. 4.

In mirror symmetry with respect to the passages just described, which are situated on one side of the central plane 75, corresponding passages are also arranged on the other side of the central plane 75. A fluid passage 120 formed in the port plate 12 leads from port opening 22 to the fluid chamber 95 of check valve cartridge 87. In this case, fluid passage 120 extends between two through holes 121 and 122 for fastening screws. Through hole 121 is at a shorter distance from the central plane 75 than through hole 122 and at a greater distance from the third plane 84 than through hole 122.

The fluid chamber 96 of check valve cartridge 87 is part of a fluid passage system which extends between check valve 38, pressure-limiting and anti-cavitation valve 41 and inner opening 26 in FIG. 2 and has segment passages 123a, 123b and 123c. Segment passage 123a extends between fluid chamber 102 and inner opening 25, segment passage 123b extends between fluid chamber 102 and fluid chamber 94, and segment passage 113c extends between fluid chamber 96 and pressure-limiting and anti-cavitation valve 41. This segment passage 123c and fluid passage 120 intersect when viewing the port plate in a direction perpendicular to plane 15, as is the case in FIG. 4.

Connecting passage 39 extends between the two pressure-limiting and anti-cavitation valves 40 and 41.

A mode of the hydrostatic axial piston motor in which oil under pressure delivered by a pump flows to port opening 21 will now be considered. The oil flows through passage 110 into fluid chamber 93. Pressure builds up, holding closing body 97 on its seat and opening closing body 98. The oil flows via fluid chamber 94, segment passage 113b, fluid chamber 101 and segment passage 113a to inner opening 25, penetrates from there into the displacement spaces of the cylinder drum 16 and is expelled from said spaces again via inner opening 26. Via segment passage 123a, the oil flows into fluid chamber 102 and, from there, flows unthrottled into fluid chamber 92 and onward into fluid chamber 91 since the counterbalance spool 31 has been displaced fully to the right, as viewed in FIG. 4, by the inlet pressure to which the oil flowing to inner opening 25 is subject. The oil flows via closing body 99, which is raised from its seat, into fluid chamber 95 and, via passage 120, to port opening 22. Closing body 100 is held on its seat.

If the axial piston motor is now driven externally, e.g. when driving downhill, the inlet pressure in passage 110 and in segment passages 113b and 113a falls. If the inlet pressure falls below the value to which the counterbalance valve 30 is set, the counterbalance spool 31 is moved in the direction of the closed central position thereof. As a result, the through flow cross section between fluid chambers 102 and 92 is reduced and the returning oil is built up in segment passage 123a. The pressure in segment passage 123a rises and brakes the motor until the speed corresponds once again to the inflowing volume flow.

The shuttle valve 44 is inserted into the port plate 12 through a long bore from a side opposite the brake release valve 45.

As can be seen in FIGS. 4 and 7, the two check valves 66 and 67 are inserted into the port plate 12 from the mounting surface 125 for the control valve 60. In FIG. 7, it is also possible to see in the mounting surface 125 two passages 126 and 127, via which the pressure chamber 54 and the adjusting chamber 55 of the adjusting piston 51 are connected to the control valve 60.

LIST OF REFERENCE SIGNS 10 housing
11 main housing part
12 port plate
13 drive shaft
14 axis of 13
15 plane
16 cylinder drum
17 mounting edge of 12
19 port surface
20 port surface
21 port opening in 19
22 port opening in 20
23 threaded holes
24 fourth plane
25 inner opening
26 inner opening
27 first fluid passage
28 second fluid passage
30 counterbalance valve
31 counterbalance spool
32 inlet of 30
33 inlet of 30
34 outlet of 30
35 check valve
36 check valve
37 check valve
38 check valve
39 connecting passage between 40 and 41
40 pressure-limiting and anti-cavitation valve
41 pressure-limiting and anti-cavitation valve
42 switching valve
43 brake pressure reducing valve
44 shuttle valve
45 brake release valve
49 blind hole
50 adjusting device
51 adjusting piston
52 piston rod
53 pressure piston
54 pressure chamber
55 adjusting chamber
56 cover
57 axis of 40
58 axis of 41
60 control valve
61 housing of 60
62 pressure port of 60
63 tank port of 60
64 adjusting port of 60
65 bore
66 check valve
67 check valve
70 control valve piston
71 feedback spring
72 return spring
75 central plane of 12
76 through hole in 12
77 axis of 76
78 adjusting pin
79 blind hole in 52
80 stop disk
81 follow-up spring
82 valve bore for 31
83 axis of 31 and 82
84 third plane
85 depression in 12
86 check valve cartridge
87 check valve cartridge
90 receptacle in 12
91 fluid chamber
92 fluid chamber in 76
93 fluid chamber
94 fluid chamber
95 fluid chamber
96 fluid chamber
97 closing body
98 closing body
99 closing body
100 closing body
101 fluid chamber
102 fluid chamber
110 fluid passage
111 through hole
112 through hole
113a segment passage
113b segment passage
113c segment passage
115 fastening screws
120 fluid passage
121 through hole
122 through hole
123a segment passage
123b segment passage
123c segment passage
125 mounting surface for 60
126 hole
127 hole
T leakage oil port
X control port
S suction port

What is claimed is:

1. A variable-displacement hydrostatic axial piston motor of bent-axis construction, comprising:
 a drive shaft;
 a cylinder drum configured to be pivoted in a pivoting plane;
 a one-piece port plate, which has a central plane extending parallel to the pivoting plane, and on which there are two working ports with flat port surfaces, of the two working ports, one working port is situated on one side of the central plane and the other working port is situated at the same distance from the central plane on the other side of the central plane;
 an adjusting device including an adjusting piston arranged in a cylindrical receiving space of the port plate;
 a control valve arranged on a first side of the port plate and having a control valve piston,
 a feedback spring arranged in the port plate and clamped between the adjusting piston and the control valve piston, the feedback spring arranged together with the adjusting piston and the control valve piston on one axis;
 a counterbalance valve having a counterbalance spool; and
 two secondary pressure-limiting valves inserted as cartridge-type inserts into the port plate, one of the secondary pressure-limiting valves is arranged on one side of the central plane and the other of the secondary pressure-limiting valves is arranged on the other side, wherein the counterbalance spool is accommodated in a valve bore in the port plate, the valve bore extending perpendicular to the central plane, wherein the two working ports are situated on an opposite side of the port plate as the first side, and the flat port surfaces are configured as two mutually spaced port surfaces, and wherein the two secondary pressure-limiting valves are (i) arranged on the same side of a third plane as the flat port surfaces, the third plane passing through the axis of the valve bore for the counterbalance spool and extending perpendicular to the axis of the adjusting device and (ii) arranged between the two flat port surfaces.

2. The hydrostatic axial piston motor according to claim 1, wherein the port plate has a depression between the two flat port surfaces and wherein a cover secured on the port plate is arranged in the depression, the cover closing the cylindrical receiving space of the port plate for the adjusting piston and thereby closing a pressure space on one side of the adjusting piston.

3. The hydrostatic axial piston motor according to claim 2, wherein the adjusting piston is a differential piston that has effective areas of different size.

4. The hydrostatic axial piston motor according to claim 1, further comprising:
a first check valve, which is arranged between the one working port and an inlet of the counterbalance valve and blocks flow towards the one working port, is arranged parallel to the axis of the counterbalance spool on the one side of the central plane; and
a second check valve, which is arranged between the other working port and a second inlet of the counterbalance valve and blocks flow towards the other working port, is arranged parallel to the axis of the counterbalance spool on the other side of the central plane.

5. The hydrostatic axial piston motor according to claim 4, wherein:
the first check valve and a third check valve, which is arranged between an outlet of the counterbalance valve and the one working port and opens towards the one working port, are combined to form a first cartridge-type check valve insert having a first central axis,
the second check valve and a fourth check valve, which is arranged between the outlet of the counterbalance valve and the other working port and opens towards the other working port, are combined to form a second cartridge-type check valve insert having a second central axis,
the first cartridge-type check valve insert is arranged parallel to the axis of the counterbalance spool on the one side of the central plane, and
the second cartridge-type check valve insert is arranged parallel to the axis of the counterbalance spool on the other side of the central plane.

6. The hydrostatic axial piston motor according to claim 4, wherein the first check valve and the second check valve each have a longitudinal axis, and are arranged such that the longitudinal axis of the first check valve is aligned with the longitudinal axis of the second check valve.

7. The hydrostatic axial piston motor according to claim 4, wherein the first check valve and the second check valve are arranged on the same side of the third plane as the two secondary pressure-limiting valves, although a distance between the first check valve and the third plane and the second check valve and the third plane is less than a distance between the two secondary pressure-limiting valves and the third plane.

8. The hydrostatic axial piston motor according to claim 4, wherein:
a first fluid passage, which extends between one of the flat port surfaces and an installation bore for the first check valve, opens into the installation bore closer to the central plane than a second fluid passage, which extends between one of the secondary pressure-limiting valves and the same installation bore, and
the first fluid passage and the second fluid passage intersect in a projection parallel to the central plane of the port plate and perpendicular to the axis of the adjusting device.

9. The hydrostatic axial piston motor according claim 8, wherein:
the port plate has a first through hole at a distance from the third plane, on the same side as that on which the two working ports are also situated, the first through hole being at a certain distance from the central plane, and a second through hole,
one or more of (i) the distance of the second through hole from the third plane is less than that of the first through hole and (ii) the distance of the second through hole from the central plane is greater than that of the first through hole, and
a fluid passage passes between the first through hole and the second through hole.

10. The hydrostatic axial piston motor according to claim 1, wherein the flat port surfaces lie in a fourth plane that extends parallel to the axis of the drive shaft and is perpendicular to the pivoting plane.

11. The hydrostatic axial piston motor according to claim 1, wherein the two secondary pressure-limiting valves are arranged with the valve axes thereof are parallel to the central plane.

* * * * *